Oct. 8, 1957 — K. K. KERR ET AL — 2,808,599
PIPE THREADING DIE HEAD ASSEMBLY
Original Filed Nov. 20, 1951

INVENTORS
KARL K. KERR,
EDWARD J. KLEBER, Jr.
& SAMUEL H. S. RAUB
By D.C. Harrison
ATTORNEY

United States Patent Office 2,808,599
Patented Oct. 8, 1957

2,808,599

PIPE THREADING DIE HEAD ASSEMBLY

Karl K. Kerr, Lakewood, Ohio, Edward J. Kleber, Jr., Niagara Falls, N. Y., and Samuel H. S. Raub, Bay Village, Ohio, assignors to Union Carbide Corporation, a corporation of New York Original application November 20, 1951, Serial No. 257,232, now Patent No. 2,744,269, dated May 8, 1956. Divided and this application December 23, 1955, Serial No. 555,090

1 Claim. (Cl. 10—123)

This invention relates to die heads for pipe threading, and, more particularly, to die heads for threading impervious carbon and graphite pipe. Heretofore, pipe threading has been accomplished by use of standard dies wherein the cutting teeth have a constant pitch and pitch diameter. The first few teeth of each chaser of the standard die heads are truncated to form a throat, so that the thread is generated by a series of teeth of the same pitch diameter, each tooth cutting by that amount which it projects inwardly further than the preceding tooth. When such dies are used to thread carbon and graphite pipe the threads generated are scratched, scored and ragged due to the fact that each succeeding tooth cuts deeper without cleaning up any of the thread surface generated by the preceding tooth.

It is an object of the present invention to provide a die head that will generate threads on pipe without crushing, scratching, or damaging the thread surface.

Another object is to provide a die head that will generate a pipe thread having a gradually stepped runout of decreasing pitch diameter in the region of furthest threading.

A further object is to provide for a die head assembly that will generate pipe threads without requiring an external force to hold the assembly to the pipe once it has been set thereon preparatory to the commencement of the threading operation.

A still further object is to provide a die head that will generate smooth threads on pipe made of highly abrasive material, such as impervious carbon and graphite.

Other objects and advantages of this invention will be apparent during the course of the following description.

Figure 1:
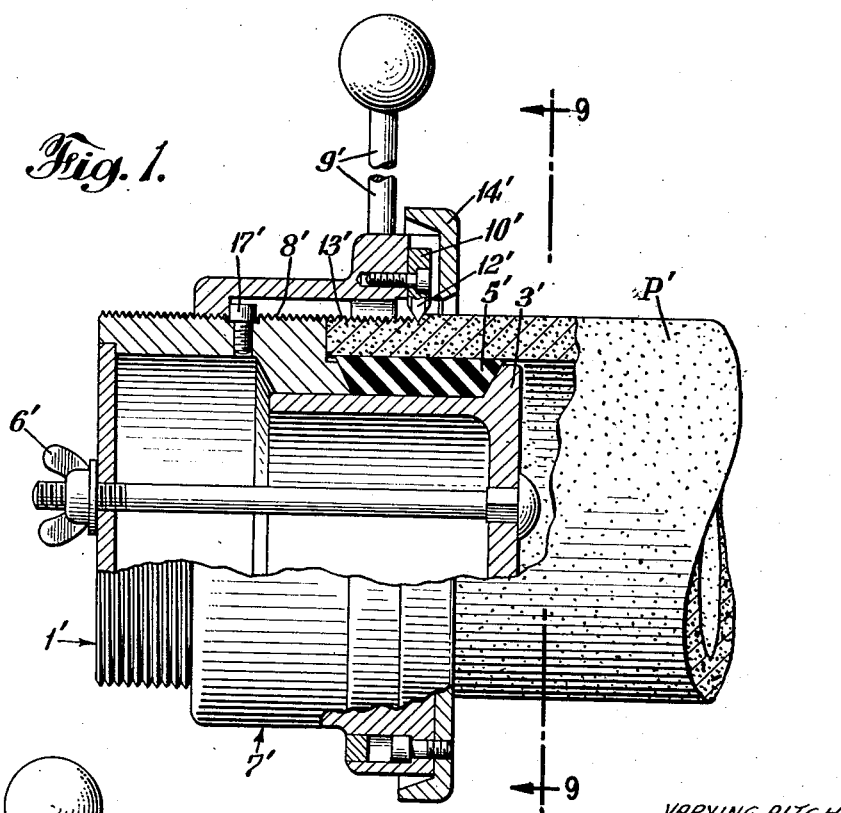
Fig. 1 is a partial longitudinal sectional view of a hand threading die head embodying the present invention and engaged pipe in the fully threaded position.
Figure 2:
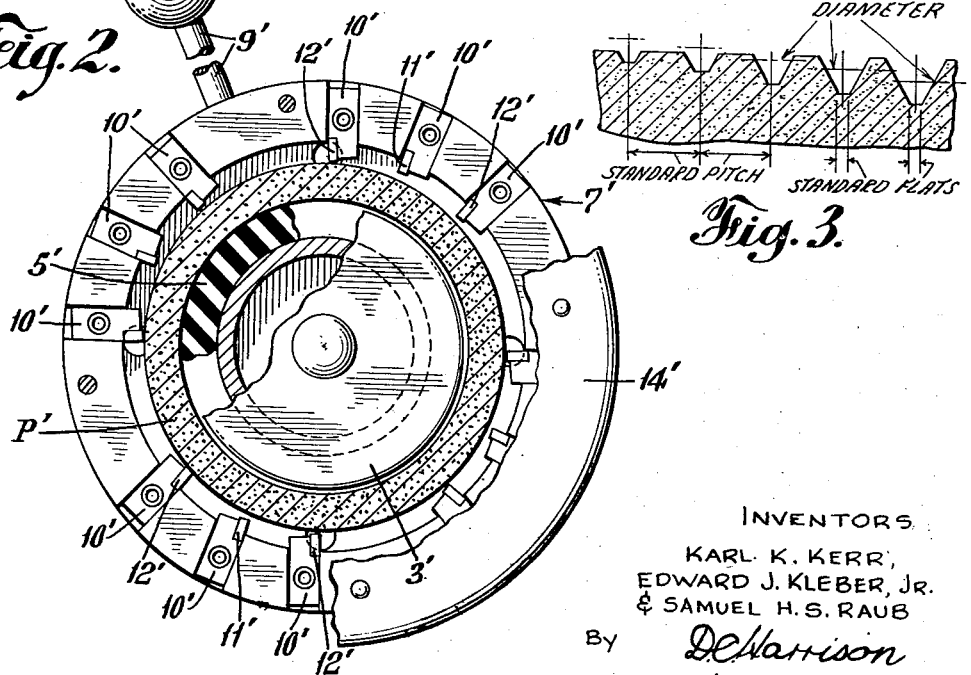
Fig. 2 is a sectional view taken along the line 9—9 of Fig. 1, the front plate of the die head having been removed to show the radial arrangement of cutting teeth and sizing nibs, part being broken away.

A die head assembly embodying the present invention is shown in Figs. 1 and 2 and comprises a stepped-diameter cylindrical mandrel 1', having at one end a relatively large diameter threaded portion and a relatively reduced diameter pipe-grasping arbor section 3' at the opposite end. The pipe-grasping arbor carries a sleeve of rubber or other suitable material 5' which expands to grasp the internal surface of pipe P' as wing nut 6' is tightened causing a retraction of the front plug of mandrel 1'. The hollow cylindrical die head 7' is mounted axially on the mandrel so that the die head moves along the threaded portion of the mandrel as it is rotated. In manual operation this rotation of the head may be accomplished by means of handle 9'. The die head 7' supports radially-positioned chasers 10' which are positioned around the internal periphery of the die head. Sizing nibs 11' are provided for trimming the outside diameter of the pipe. Chaser-mounted cutting teeth 12' are provided of pitch equal to the threads of the threaded portion of mandrel 1' which act as pushers to maintain the proper thread pitch for the cutting teeth 12' as the cutting teeth generate threads on the work. The cutting teeth 12' are individually mounted on separate chasers and staggered in position to provide varying pitch diameters. A front plate 14 holds the chasers in the die head.

Figure 3:
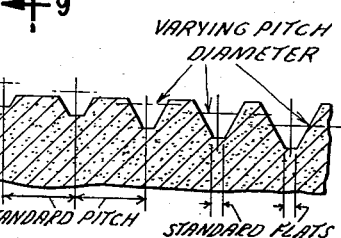
Fig. 3 is a partial sectional view of a partly threaded pipe illustrating the effect of variations in cutting tooth pitch diameter.

The chasers are so constructed and arranged that the sizing nibs 11' turn down the outside diameter of pipe P' to the proper major diameter for threading before the commencement of the threading operation. Then, as the head is further advanced along the mandrel, the first cutting tooth cuts approximately twenty-five percent full thread depth. Subsequent teeth, following at intervals, cut to a progressively greater thread depth with the fifth tooth in sequence cutting to full depth, as shown in Fig. 3 of the drawing. This means that, when using the embodiment shown in the drawings, full thread depth is attained in one and a quarter turns of the die head after the first tooth has engaged the pipe.

All cutting teeth on the chasers of the die head of the present invention are of full tooth shape but of varying pitch diameters. Of the total of eight cutting teeth on the embodiment of the present invention shown in the drawings, only five actually cut when the die head is new. As these teeth become dull with use and are sharpened, the pitch diameters are increased and teeth six, seven, and eight take on work progressively.

In operation, the pipe to be threaded is suitably secured in a vise. Before using the illustrated assembly, the die head 7' is turned back to the rear of the mandrel 1'. The arbor section 3' is then inserted into the pipe up to the front shoulder of the mandrel, and, while the mandrel 1' is held stationary, the wing nut 6' on the end of the mandrel is tightened. This causes an expansion of the rubber arbor 3' and securely holds the die head assembly to the pipe, as is shown in Fig. 1.

The actual threading operation is then begun by turning the knobbed handle 9' in a clockwise direction. This is continued until the head 7' contacts stop 17' which resists further turning. When it is desired to generate greater lengths of thread the stop 17' is removed so that the die head 7' may move off mandrel and continue threading the pipe to any desired point. The die head assembly may be removed after the threading operation is completed by backing die head 7' off the pipe with a counter-clockwise motion, loosening the wing nut 6' of the handle end of mandrel 1' and removing the mandrel from the pipe.

The thread generated by the die head of the present invention has a gradually stepped runout and not a relief of full depth such as on a standard lathe-chased thread. When the die head of the present invention is used for threading highly abrasive materials, such as impervious carbon or graphite pipe, it has been found advantageous to employ nibs and cutting teeth of sintered carbide, silver soldered, brazed, or otherwise secured into position on the chaser.

This is a division of our copending application Serial No. 257,232 filed November 20, 1951, issued on May 8, 1956, as U. S. Patent 2,744,269.

What is claimed is:

A die head assembly for threading impervious carbon and graphite pipe to any desired length comprising a stepped-diameter cylindrical mandrel having a threaded portion near the rear end thereof, a reduced diameter expandable arbor section at the front end thereof for insertion into said pipe, and means for expanding said arbor section to engage the interior of said pipe; a die head having a plurality of pusher teeth positioned near the rear end thereof and a plurality of pusher teeth positioned near the front end thereof for rotatably engaging said threaded portion of said mandrel; a plurality of chasers symmetrically and circumferentially disposed around and rigidly secured to said die head; a single cutting tooth separately and rigidly secured to each of said chasers and projecting inwardly in advance of the front end plurality of pusher teeth to cut said pipe, there being a total of at least five such cutting teeth positioned to cut symmetrically to full thread profile and successive cutting teeth arranged to cut progressively deeper whereby a thread of full depth is developed on said pipe in less than one and one-half revolutions of said die head; said plurality of die head pusher teeth having the same pitch as said cutting teeth and a pitch diameter equal to the pitch diameter of the cutting teeth which are positioned to cut said pipe to full depth.

References Cited in the file of this patent

UNITED STATES PATENTS

| | | |
|---|---|---|
| 1,053,482 | Dreier | Feb. 18, 1913 |
| 2,744,269 | Kerr et al. | May 8, 1956 |